(12) United States Patent
Stone et al.

(10) Patent No.: US 10,181,968 B2
(45) Date of Patent: Jan. 15, 2019

(54) SYSTEM AND METHOD FOR BACKCHANNEL CLOSED LOOP FEEDBACK FOR CHANNEL EQUALIZATION OVER ETHERNET

(71) Applicant: AVAGO TECHNOLOGIES INTERNATIONAL SALES PTE. LIMITED, Singapore (SG)

(72) Inventors: Robert John Stone, Berkeley, CA (US); Howard Frazier, Pleasanton, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 338 days.

(21) Appl. No.: 14/633,739

(22) Filed: Feb. 27, 2015

(65) Prior Publication Data

US 2016/0164703 A1  Jun. 9, 2016

Related U.S. Application Data

(60) Provisional application No. 62/087,586, filed on Dec. 4, 2014.

(51) Int. Cl.
*H04L 25/03* (2006.01)
*H04B 10/25* (2013.01)
*H04L 12/26* (2006.01)
*H04B 10/077* (2013.01)
*H04B 10/079* (2013.01)

(52) U.S. Cl.
CPC ... *H04L 25/03057* (2013.01); *H04B 10/0779* (2013.01); *H04B 10/0799* (2013.01); *H04L 25/03159* (2013.01); *H04L 25/03343* (2013.01)

(58) Field of Classification Search
CPC .............. H04L 25/03057; H04L 43/08; H04L 25/03343; H04L 25/03159; H04B 10/25
See application file for complete search history.

(56) References Cited

U.S. PATENT DOCUMENTS

| | | | | |
|---|---|---|---|---|
| 6,532,320 B1* | 3/2003 | Kikuchi | .................. | H04J 14/02 385/15 |
| 7,426,235 B1* | 9/2008 | Anderson | ......... | H04L 25/03343 375/221 |
| 2003/0025957 A1* | 2/2003 | Jayakumar | ............. | H04B 10/00 398/5 |
| 2005/0195893 A1* | 9/2005 | Brunn | ............... | H04L 25/03019 375/232 |
| 2006/0262229 A1* | 11/2006 | Takeda | ............... | H04N 21/2368 348/725 |
| 2010/0266006 A1* | 10/2010 | Werner | .................. | H04L 25/028 375/232 |
| 2012/0249871 A1* | 10/2012 | Nguyen | .................. | H04B 10/40 348/441 |
| 2015/0071636 A1* | 3/2015 | Hu | .......................... | H04L 47/25 398/52 |
| 2015/0131987 A1* | 5/2015 | Yang | .................... | H04B 10/077 398/16 |

* cited by examiner

*Primary Examiner* — Mina Shalaby
(74) *Attorney, Agent, or Firm* — Foley & Lardner LLP

(57) ABSTRACT

A system and method for backchannel closed loop feedback for channel equalization over Ethernet. Closed loop backchannel feedback for real-time transmitter adaptive equalization is provided for a pair of non-ideal duplex communication channels. The real-time transmitter adaptive equalization enables use of low cost relaxed specification transmitter modules at high data rates.

20 Claims, 3 Drawing Sheets

SYSTEM AND METHOD FOR BACKCHANNEL CLOSED LOOP FEEDBACK FOR CHANNEL EQUALIZATION OVER ETHERNET

This application claims the benefit of and priority to Provisional Application No. 62/087,586, filed Dec. 4, 2014, which is incorporated herein by reference in its entirety.

BACKGROUND

Field

The present disclosure relates generally to networking and, more particularly, to a system and method for backchannel closed loop feedback for channel equalization over Ethernet.

Introduction

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. Ethernet networks are increasingly utilized to carry, for example, voice, data, and multimedia.

As the number of devices connected to data networks increases and higher data rates are required, there is a growing need for new transmission technologies which enable higher data rates. New transmission technologies enable higher transmission rates over various communication mediums such as copper, optical, etc.

With each rate increase more sophisticated signal processing is required to remove or reduce the effects of severe frequency-dependent signal attenuation. For high data rate communications, signal integrity considerations in many cases require that electrical channel equalization (EQ) be present as part of the transmit and receive chain to compensate for the frequency dependence of the channel loss.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Figure 1:
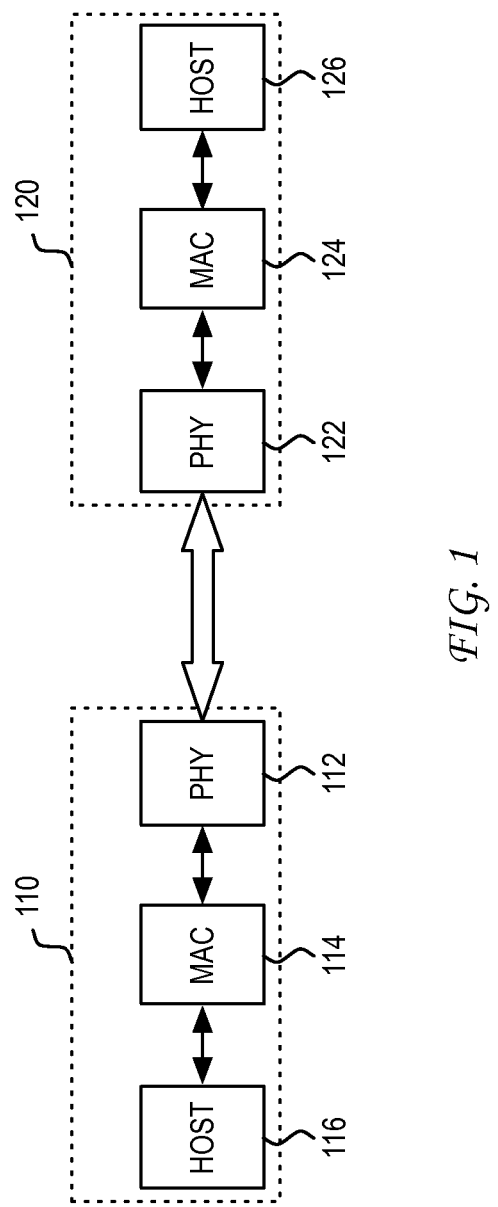
FIG. 1 illustrates an example of network link between link partners.

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

As noted, channel EQ is a key element for maintaining signal integrity for high data rate communications. In general, the level of transmit and receive EQ can be pre-set during link bring-up by sending a training sequence of symbols to enable the link to "learn" the optimal compensation settings. This configuration process is performed prior to active data communication on the link between link partners. Such pre-setting of transmit and receive EQ can be used in communications channels based on copper cables, as well as backplane and PCB traces.

For communication channels based on optical links, no training or EQ is typically performed during the link bring-up process. Such optical links are considered "engineered" and requires the frequency response of the transmitter and receiver to be very flat. Furthermore, optical links are typically designed with enough margin such that the link operates with sufficient performance over a lifetime of use, with acceptable degradation when variations in voltage and temperature are encountered. As would be appreciated, the stringent specifications on the frequency response of the optical modules can add significant cost to the network link.

In the present disclosure, it is recognized that real-time equalization applied to transmitter modules can effectively increase their ability to meet stringent specifications on frequency response. For example, through the use of real-time equalization, a relaxed specification 10G optical module can be used in a 40G/100G application without active temperature control. The reduction in interconnect cost through such an application of real-time equalization is significant.

In one embodiment, a closed loop backchannel feedback mechanism is used for real-time transmitter adaptive equalization for a pair of non-ideal duplex communication channels. In an example process, a network link is first configured for active data communication between a first network device and a second network device via a physical communication medium (e.g., copper or optical media). In this link bring-up process, the link may or may not include an initial training for link equalization. After the network link is configured for active data communication, live data traffic can then be communicated over the network link between a first physical layer device in the first network device and a second physical layer device in the second network device. During active data communication over the network link, the first network device can be configured to measure a frequency response of a communication channel that includes the physical communication medium. Based on the measured frequency response of the communication channel, the first network device can then determine an equalization adjustment for a transmitter in the second network device. The first network device can then transmit equalization adjustment information to effect the determined equalization adjustment to the second network device for adjustment of a transmit equalizer in the second physical layer device.

In one embodiment, the transmission of equalization adjustment information can be performed using an in-band or out-of-band channel. For example, equalization adjustment information can be transmitted during an inter-packet gap, as part of a data transmission frame, as a dedicated packet that is interspersed with packets carrying live traffic, as a low frequency modulation signal applied to a transmitted signal, or in any other transmission mechanism that is available between two network devices.

At the second network device, signals received from the first network device during active data communication are analyzed to determine whether the received signal includes equalization adjustment information from the first network device. When the determination indicates that the received signal includes live data, then the second network device would be configured to forward the received data to a media access control device for processing by higher layers. On the other hand, when the determination indicates that the received signal includes equalization adjustment information, then the received equalization adjustment information is forwarded to a transmit equalizer in the second network device. The forwarded equalization adjustment information can then be used to adjust the transmit equalizer. In combination, this end-to-end backchannel closed loop feedback mechanism enables link signal integrity to be maintained for a pair of non-ideal duplex communication channels.

Prior to describing a mechanism for backchannel closed loop feedback for channel equalization, reference is made first to FIG. 1, which illustrates an example network link to which the principles of the present disclosure can be applied. As illustrated, the example link supports communication between a first link partner 110 and a second link partner 120. In various embodiments, link partners 110 and 120 can represent a switch, router, endpoint (e.g., server, client, VOIP phone, wireless access point, etc.), or any other network device. As illustrated, link partner 110 includes physical layer device (PHY) 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to physical layer devices (PHYs) 112 and 122, respectively. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

Figure 2:
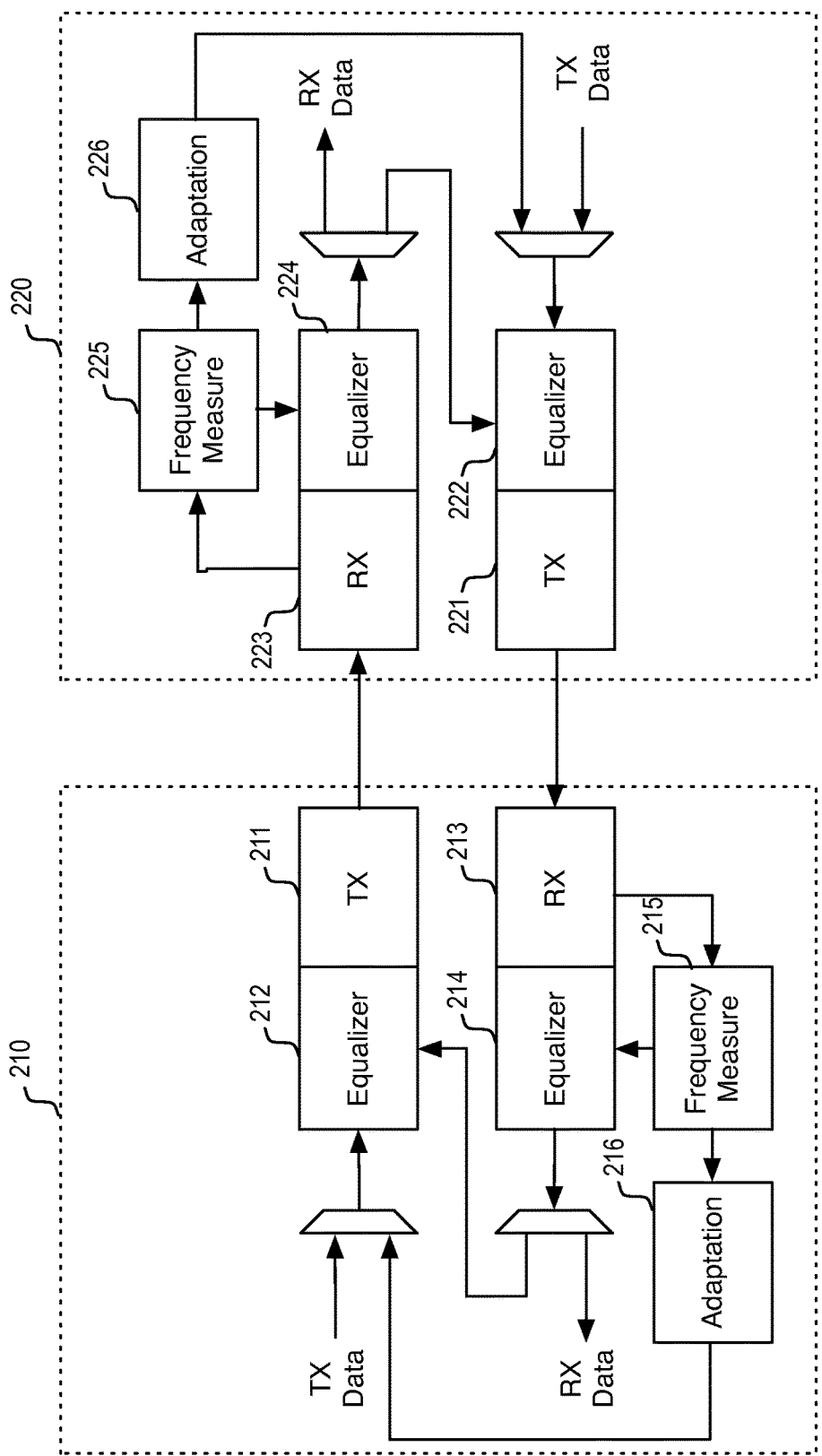
FIG. 2 illustrates an example implementation of a backchannel closed loop feedback mechanism for channel equalization in an active network link.

FIG. 2 illustrates an example implementation of a backchannel closed loop feedback mechanism for channel equalization in a network link between two link partners. As would be appreciated, the particular form of communication media (e.g., copper, optical or other media that facilitates communication) used in the network link would be implementation dependent.

As illustrated, link partner 210 includes transmitter 211, transmit equalizer 212, receiver 213, and receive equalizer 214, while link partner 220 includes transmitter 221, transmit equalizer 222, receiver 223, and receive equalizer 224. In the present disclosure it is recognized that one or more of transmit equalizer 212, receive equalizer 214, transmit equalizer 222, and receive equalizer 224 can be trained as part of the link bring-up process.

In other words, one or more of transmit equalizer 212, receive equalizer 214, transmit equalizer 222, and receive equalizer 224 can be trained during the link bring-up process to remove or reduce the effects of severe frequency-dependent signal attenuation introduced by the network link.

Notwithstanding the potential training during the link bring-up process, the present disclosure recognizes that such training would not be designed to compensate for other changes or variations that occur after active data communication commences after link bring-up. A closed-loop feedback mechanism is therefore provided to effect training or EQ during the active data communication process.

To illustrate this closed-loop feedback mechanism, reference is now made to the example network link of FIG. 2. Beginning with link partner 210, TX data is transmitted using transmit equalizer 212 and transmitter 211 to link partner 220 over a communication medium. The transmitted signal is received by receiver 223 and processed using receive equalizer 224 to produce RX data that is forwarded to higher layers. Prior to receive equalization a portion of the received signal is measured by frequency measure module 225 to determine the spectral frequency content. This could be done by measurement of the frequency content of the incoming data, assuming it is quasi-random.

Here, it should be noted that the frequency response of the end-to-end communication channel would represent the cumulative frequency response of the transmit equalizer 212, transmitter 211 (e.g., laser and/or modulator), the communication medium (e.g., optical cable), receiver 223, and receive equalizer 224. Frequency measure module 225 can generate an output based on the frequency response measurement that can be used by receive equalizer 224 to adapt that portion of the communication channel.

Frequency measure module 225 can also generate an output based on the frequency response measurement to adaptation module 226 for determination of an adjustment to transmit equalizer 212. This adjustment information can be transmitted from link partner 220 to link partner 210 during the active data communication process. While the illustration in FIG. 2 includes a multiplexer-type device that receives the adjustment information from adaptation module 226 as well as TX data, such an illustration is provided for functional illustration. The particular mechanism by which the adjustment information is transmitted during the active data communication process along with TX data would be dependent on the particular transmission mechanism used (e.g., in-band vs. out-of-band). As will be described in greater detail below, various options exist for transmitting the adjustment information to the far end link partner. The high-level illustration of FIG. 2 is not intended to be limiting on the scope of the present disclosure.

The adjustment information can be transmitted from link partner 220 to link partner 210 via transmit equalizer 222, transmitter 221, receiver 213 and receive equalizer 214. At link partner 210, a determination is made as to the content of the received signals. If the received signals contain live data, then the RX data is forwarded to higher layers for processing. If, on the other hand, the received signals contain adjustment information, then the received adjustment information is forwarded to transmit equalizer 212 for adjustment of that part of the communication channel.

As has been described, the closed-loop feedback mechanism has enabled adjustment of both transmit equalizer 212 and receive equalizer 224 during the active data communication process from link partner 210 to link partner 220 using backchannel communication.

In the opposite direction from link partner 220 to link partner 210, a similar closed-loop feedback mechanism would be used. Here, prior to receive equalization a portion of the received signal is measured by frequency measure module 215 to determine the spectral frequency content. Frequency measure module 215 in link partner 210 can generate an output based on the frequency response measurement that can be used by receive equalizer 214 to adapt that portion of the communication channel. Frequency measure module 215 can also generate an output based on the frequency response measurement to adaptation module 216 in link partner 210 for determination of an adjustment to transmit equalizer 222. This adjustment information can be transmitted from link partner 210 to link partner 220 during the active data communication process.

The adjustment information can be transmitted from link partner 210 to link partner 220 via transmit equalizer 212, transmitter 211, receiver 223 and receive equalizer 224. At link partner 220, a determination is made as to the content of the received signals. If the received signals contain live data, then the RX data is forwarded to higher layers for processing. If, on the other hand, the received signals contain adjustment information, then the received adjustment information is forwarded to transmit equalizer 222 for adjustment of that part of the communication channel.

As has been described, the closed-loop feedback mechanism has enabled adjustment of both transmit equalizer 222 and receive equalizer 214 during the active data communication process from link partner 220 to link partner 210 using backchannel communication without requiring additional link training, which can interrupt the flow of live traffic.

In the example of low-cost, high-speed optical modules, closed loop real-time EQ feedback is advantageous because it is unlikely that any training of the link EQ during link bring-up would be sufficient to cover the likely range of operation. Regardless of the training of the link EQ during link bring-up, the frequency response of a typical optical link would change depending on temperature, voltage and device age. Although the change due to voltage and aging should be very slow, temperature effects can vary on the order of minutes. Thus, EQ settings established during any training at link bring-up would not necessarily be valid after the system warms up. As optical modules heat up, their frequency response would typically degrade in comparison to that which could be measured prior to active data communication. This effect is especially true for certain types of low cost lasers, such as directly modulated lasers (DMLs) and Vertical Cavity Surface Emitting Lasers (VCSELs).

Implementation of a closed-loop feedback mechanism where the link partners signal over a backchannel path to enable EQ control would mitigate link performance degradation due to short term changes in frequency response. Such a process can be used to continuously adapt the transmit EQ based on feedback derived from the link partner receiver, over the opposing backchannel. This is useful during situations where the overall channel bandwidth is changing in real time, such as a DML heating up after system start-up. In this case the closed-loop EQ feedback would compensate for the changes in link bandwidth, thus maintaining signal integrity and BER.

Figure 3:
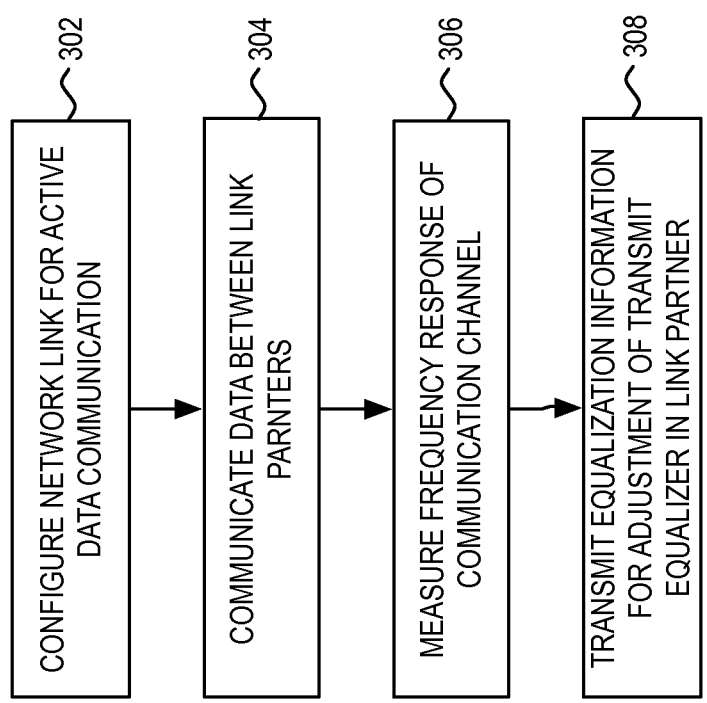
FIG. 3 illustrates a flowchart of an example process of the present disclosure.

Having described a general framework of a closed-loop feedback mechanism, reference is now made to FIG. 3, which illustrates an example process. As illustrated, the process begins at step 302 where a network link is configured for active data communication. Here, it is recognized that the configuring of the network link may or may not include training for link EQ during the link-bring up process. Upon completion of the configuration of the network link, the process then continues to step 304 where link partners can communicate live data traffic over the network link.

As noted the communication of live data traffic can produce changes in the frequency response of a network link due to factors such as temperature, voltage and device age. Thus, at step 306, a link partner can measure a frequency response of the communication channel during the communication of live data traffic. The measurement of the frequency response enables adaptation of the link EQ.

In one example, the measurement of the frequency response can be used to adjust a local receive equalizer. Such an adjustment is not required. In one embodiment, the link partner does not include a receive equalizer, thereby increasing the reliance on the transmit equalizer. Such an embodiment would be simpler as it would require less circuits/power.

In the present disclosure, adaptation of the transmit equalizer is effected using a backchannel mechanism to effect closed-loop feedback. Here, the measurement of the frequency response is used to produce adjustment information for the transmit equalizer in the far-end link partner. At step 308, this equalization information is transmitted to the far-end link partner for adjustment of the transmit equalizer in the far-end link partner.

Transmission of the equalization information can be accomplished through a variety of in-band or out-of-band mechanisms. In one example, the equalization information can be included as part of the overhead information in a transmission frame (e.g., Ethernet). In another example, the equalization information can be separate from the transmission protocol and included in separate packets that are interleaved with packets carrying live traffic. Here, inter-CPU Ethernet packets containing the equalization information would be created by the host link partner CPUs, and passed to the appropriate port for transmission, interspersed with the live traffic packets. In one embodiment, the equalization information can be transmitted during the inter-packet gap (IPG), thereby reducing the idle duration.

In yet another example, a low frequency low modulation depth (~5%) tone can be applied to a transmitted signal (either optical or electrical). Here, the signal could be coded using amplitude modulation (AM), frequency modulation (FM), phase shift keying (PSK), or some other modulation method. The signal can be de-modulated at the receiver end of the network link and the baseband signal recovered to access the equalization information.

In various embodiments, the implementation of the backchannel feedback mechanism can be designed to co-exist with various standard protocols such as Ethernet, Infiniband, Fiberchannel, SATA, PCIe, USB, or other network protocols. Also, in various embodiments, the equalization adaptation request can be based on an analysis of symbol errors, can be based on an interspersed training sequence in IPG, can be based on a fitting of a data spectrum in frequency domain to an ideal spectrum, and can be based on a multi-frequency power measurement, which is compared with an ideal power distribution.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
   configuring a network link for active data communication between a first network device and a second network device via a physical communication medium;
   after the network link is configured for active data communication, communicating data between a first physical layer device in the first network device and a second physical layer device in the second network device;
   analyzing, by the first network device during the active data communication, a frequency response of a communication channel that includes the physical communication medium, corresponding to a change in heat generation in the first network device over a time duration in the order of minutes during the active data communication;
   determine, by the first network device during the active data communication responsive to the change in heat generation in the first network device over the time duration, an equalization adjustment based on the analyzed frequency response; and
   transmitting, by the first network device, equalization information to the second network device in an amplitude, frequency or phase modulated signal using a packet that is interspersed with packets carrying live traffic of data communicated between the first and second physical layer devices, for adjustment of a transmit equalizer in the second physical layer device, the equalization information based on the determined equalization adjustment.

2. The method of claim 1, further comprising measuring, by the first network device, the frequency response of a data signal received from the second physical layer device.

3. The method of claim 1, further comprising adjusting a receive equalizer in the first physical layer device based on the analysis of the frequency response during the active data communication.

4. The method of claim 1, wherein the transmitting comprises transmitting during an inter-packet gap.

5. The method of claim 1, wherein the transmitting comprises transmitting using a part of an Ethernet frame.

6. The method of claim 1, wherein the transmitting comprises transmitting the second equalization information at a signal frequency lower than that of the live traffic and interspersed with packets carrying the live traffic.

7. The method of claim 1, wherein the transmitting comprises transmitting using an out-of-band channel.

8. The method of claim 7, wherein the transmitting comprises transmitting using a low frequency modulation signal applied to a transmitted optical signal.

9. The method of claim 1, wherein the physical communication medium is an optical cable.

10. The method of claim 1, wherein the physical communication medium is a copper cable.

11. A network device, comprising:
    one or more processors of a first physical layer device, the one or more processors configured to:
      measure a frequency response of a data signal received during an active data communication mode over a physical communication medium, that corresponds to a change in heat generation in the first physical layer device over a time duration in the order of minutes during the active data communication, the active data communication mode used for communicating live data over a network link; and
      to determine, responsive to the change in heat generation in the first physical layer device over the time duration, an equalization adjustment based on the measured frequency response;
    a transmitter configured to transmit first equalization information in a first amplitude, frequency or phase modulated signal using a first packet that is interspersed with packets carrying live traffic of data communicated over the network link, to a second physical layer device of a link partner during the active data communication mode, the transmitted first equalization information enabling the link partner to adjust a first transmit equalizer in the link partner used during transmission of data to the network device in accordance with the determined equalization adjustment; and
    a receiver configured to receive second equalization information in a second amplitude, frequency or phase modulated signal using a second packet that is interspersed with other packets carrying live traffic of data communicated over the network link, from the link partner during the active data communication mode, the received second equalization information enabling the network device to adjust a second transmit equalizer in the network device used in transmission of data to the link partner.

12. The network device of claim 11, wherein the first equalization information is transmitted during an inter-packet gap.

13. The network device of claim 11, wherein the first equalization information is transmitted using a part of an Ethernet frame.

14. The network device of claim 11, wherein the first equalization information is transmitted at a signal frequency lower than that of the live traffic and interspersed with packets carrying the live traffic.

15. The network device of claim 11, wherein the first equalization information is transmitted using an out-of-band channel.

16. The network device of claim 15, wherein the first equalization information is transmitted using a low frequency modulation signal applied to a transmitted optical signal.

17. The network device of claim 11, wherein the physical communication medium comprises an optical cable or a copper cable.

18. The network device of claim 11, wherein the one or more processors are configured to configure the network link for active data communication via the physical communication medium.

19. The network device of claim 11, wherein the transmitter is configured to, after the network link is configured for active data communication, communicate data with a second physical layer device in a second network device.

20. The network device of claim 11, wherein the measurement module is configured to analyze, during the active data communication mode, the frequency response of the data signal received over the physical communication medium.

* * * * *